US012793967B2

(12) United States Patent
Du

(10) Patent No.: US 12,793,967 B2
(45) Date of Patent: Nov. 10, 2026

(54) LITHIUM IRON PHOSPHATE POSITIVE ELECTRODE PLATE, SECONDARY BATTERY RELATED TO THE SAME, BATTERY MODULE, BATTERY PACK, AND ELECTRICAL DEVICE

(71) Applicant: CONTEMPORARY AMPEREX TECHNOLOGY (HONG KONG) LIMITED, Hong Kong (CN)

(72) Inventor: Xianglong Du, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 441 days.

(21) Appl. No.: 18/382,876

(22) Filed: Oct. 23, 2023

(65) Prior Publication Data

US 2024/0047647 A1 Feb. 8, 2024

Related U.S. Application Data

(63) Continuation of application No. PCT/CN2022/089518, filed on Apr. 27, 2022.

(51) Int. Cl.

*H01M 4/58* (2010.01)
*H01M 4/134* (2010.01)
*H01M 10/0525* (2010.01)
*H01M 50/209* (2021.01)
*H01M 4/02* (2006.01)

(52) U.S. Cl.

CPC ....... *H01M 4/134* (2013.01); *H01M 10/0525* (2013.01); *H01M 50/209* (2021.01); *H01M 2004/021* (2013.01)

(58) Field of Classification Search

CPC ...... H01M 4/134; H01M 4/136; H01M 4/362; H01M 4/364; H01M 4/405; H01M 4/58; H01M 4/13; H01M 50/209; H01M 50/207; H01M 10/0525; H01M 10/052; H01M 2004/021

See application file for complete search history.

(56) References Cited

U.S. PATENT DOCUMENTS

| | | | | |
|---|---|---|---|---|
| 2008/0286655 | A1* | 11/2008 | Inoue | H01M 4/5825 429/231.95 |
| 2012/0202113 | A1 | 8/2012 | Hodge et al. | |
| 2017/0221644 | A1* | 8/2017 | Kubota | H01G 11/26 |
| 2020/0144600 | A1* | 5/2020 | Zhong | H01M 10/0525 |
| 2021/0376319 | A1 | 12/2021 | Shinoda et al. | |

FOREIGN PATENT DOCUMENTS

| | | | |
|---|---|---|---|
| CN | 108199042 | A | 6/2018 |
| CN | 108306013 | A | 7/2018 |
| CN | 109461929 | A | 3/2019 |
| CN | 111344880 | A | 6/2020 |
| CN | 113036085 | A | 6/2021 |
| CN | 113422049 | A | 9/2021 |
| CN | 113800493 | A | 12/2021 |
| CN | 114068920 | A | 2/2022 |
| JP | 2011070802 | A | 4/2011 |
| JP | 2012531726 | A | 12/2012 |
| WO | 2012047332 | A2 | 4/2012 |
| WO | 2015005228 | A1 | 1/2015 |
| WO | 2021190490 | A1 | 9/2021 |
| WO | 2022047705 | A1 | 3/2022 |

OTHER PUBLICATIONS

The World Intellectual Property Organization (WIPO) International Search Report and Written opinion for PCT/CN2022/089518 Dec. 16, 2022 19 pages (including English translation).

The Japan Patent Office (JPO) Notice of Reasons for Refusal for Application No. 2023-569615 Nov. 25, 2025 4 Pages (including translation).

The European Patent Office (EPO) Intention to Grant for Application No. 22938729.5 Apr. 17, 2025 45 Pages.

The European Patent Office (EPO) Intention to Grant for Application No. 22938729.5 Feb. 12, 2025 46 Pages.

The Japan Patent Office (JPO) Notice of Refusal for Application No. 2023-569615 Jan. 14, 2025 9 Pages (including translation).

The Korean Intellectual Property Office Request for the Submission of an Opinion for Application No. 10-2024-7007293 Aug. 26, 2025 11 Pages (including translation).

The Japan Patent Office (JPO) Notice of Reasons for Refusal for Application No. 2023-569615 Aug. 5, 2025 10 Pages (including translation).

The European Patent Office (EPO) The Extended European Search Report for Application No. 22938729.5 Aug. 2, 2024 9 Pages.

Korean Intellectual Property Office (KIPO) Notice of Final Rejection for Application No. 10-2024-7007293 Mar. 24, 2026 7 Pages (including translation).

The Japan Patent Office (JPO) Decesion to Grant a Patent for Application No. 2023-569615 Apr. 1, 2026 5 Pages (including translation).

China National Intellectual Property Administration (CNIPA) The First Office Action for Application No. 202280035187.1 May 31, 2026 17 Pages (including translation).

* cited by examiner

*Primary Examiner* — Raymond Alejandro

(74) *Attorney, Agent, or Firm* — ANOVA LAW GROUP, PLLC

(57) ABSTRACT

A lithium iron phosphate positive electrode plate includes a positive electrode current collector and a positive electrode active material located on the positive electrode current collector. The positive electrode active material includes: first lithium iron phosphate particles having a volume average diameter D50 of 60 nm to 300 nm and a specific surface area greater than 15 $m^2/g$, and second lithium iron phosphate particles having a volume average diameter D50 greater than 800 nm and a specific surface area smaller than 10 $m^2/g$.

14 Claims, 5 Drawing Sheets

LITHIUM IRON PHOSPHATE POSITIVE ELECTRODE PLATE, SECONDARY BATTERY RELATED TO THE SAME, BATTERY MODULE, BATTERY PACK, AND ELECTRICAL DEVICE

CROSS-REFERENCE TO RELATED APPLICATION

This application is a continuation of International Application No. PCT/CN2022/089518, filed on Apr. 27, 2022, the entire content of which is incorporated herein by reference.

FIELD

The present disclosure relates to the technical field of lithium batteries, and more particularly, to a lithium iron phosphate positive electrode plate, a secondary battery related to the lithium iron phosphate positive electrode plate, a battery module, a battery pack, and an electric device.

BACKGROUND

In recent years, with the increasingly broader application range of lithium-ion batteries, the lithium-ion batteries are extensively applied to an energy storage power supply system such as a water power station, a firepower station, a wind power station, a solar power station, as well as a plurality of fields, e.g., a power tool, an electric bicycle, an electric motorcycle, an electric vehicle, military equipment, aerospace. Among various battery types, lithium iron phosphate batteries draw people's attention due to large capacity and good safety performance thereof. However, with the popularity of secondary batteries, people have increasingly higher requirements for dynamic performance and cycle performance of the lithium iron phosphate batteries. Therefore, it is still an urgent problem for those skilled in the art to develop a lithium iron phosphate battery having good dynamic and cycle performances.

SUMMARY

In view of the above project, the present disclosure aims to provide a lithium iron phosphate positive electrode plate, a secondary battery related to the lithium iron phosphate positive electrode plate, a battery module, a battery pack, and an electric device. The secondary battery using the positive electrode plate has good dynamic performance and cycle performance.

A first aspect of the present disclosure provides a lithium iron phosphate positive electrode plate. The lithium iron phosphate positive electrode plate includes a positive electrode current collector, and a positive electrode active material located on the positive electrode current collector. The positive electrode active material includes: first lithium iron phosphate particles having a volume average diameter D50 of 60 nm to 300 nm, optionally 60 nm to 200 nm, and a specific surface area greater than 15 $m^2/g$, optionally 15 $m^2/g$ to 25 $m^2/g$; and second lithium iron phosphate particles having a volume average diameter D50 greater than 800 nm, optionally 1000 nm to 1500 nm, and a specific surface area smaller than 10 $m^2/g$, optionally 5 $m^2/g$ to 10 $m^2/g$.

The positive electrode plate according to the first aspect of the present disclosure includes two types of lithium iron phosphate particles having different particle diameters and specific surface areas, which can fully exert their respective advantages, thereby improving the dynamic performance and cycle performance of the secondary battery using the positive electrode plate.

In any embodiment, optionally, a content of the first lithium iron phosphate particles ranges from 1% to 97%, optionally from 18% to 68%, and further optionally from 36% to 68%, based on a total weight of a positive electrode film layer in the lithium iron positive electrode plate; and a content of the second lithium iron phosphate particles ranges from 3% to 99%, optionally from 32% to 82%, and further optionally from 32% to 64%, based on the total weight of the positive electrode film layer in the lithium iron phosphate positive electrode plate.

When the contents of the two types of the lithium iron phosphate particles are within the above-mentioned ranges, the secondary battery prepared with the positive electrode plate according to the first aspect of the present disclosure has good dynamic performance and cycle performance.

In any embodiment, optionally, in an active substance layer of the lithium iron phosphate positive electrode plate, a weight ratio of the first lithium iron phosphate particles to the second lithium iron phosphate particles is 1:0.1 to 9, optionally 1:0.4 to 4, and further optionally 1:0.4 to 1.5.

By adjusting the weight ratio of the first lithium iron phosphate particles to the second lithium iron phosphate particles, the dynamic performance and cycle performance of the corresponding battery can be further improved.

In any embodiment, optionally, a carbon content of the first lithium iron phosphate particles ranges from 1.2% to 2.7%, optionally from 1.4% to 2.2%, and further optionally from 1.4% to 2.0%, based on a total weight of the first lithium iron phosphate particles; and a carbon content of the second lithium iron phosphate particles ranges from 0.7% to 1.3%, optionally from 1% to 1.2%, and further optionally from 1.1% to 1.2%, based on a total weight of the second lithium iron phosphate particles.

When the carbon contents of the two types of the lithium iron phosphate particles are within the above-mentioned ranges, the performances of the corresponding secondary battery can be further improved.

In any embodiment, optionally, a positive electrode film layer in the lithium iron phosphate positive electrode plate has a compacted density of 2 $g/cm^3$ to 2.45 $g/cm^3$, optionally 2.1 $g/cm^3$ to 2.3 $g/cm^3$, and further optionally 2.15 $g/cm^3$ to 2.25 $g/cm^3$.

In any embodiment, optionally, the first lithium iron phosphate particles and the second lithium iron phosphate particles are distributed in layers in an active substance layer in the lithium iron phosphate positive electrode plate.

In any embodiment, optionally, a second lithium iron phosphate particle layer is disposed on a surface of the positive electrode current collector, and a first lithium iron phosphate particle layer is disposed on a surface, opposite to the positive electrode current collector, of the second lithium iron phosphate particle layer.

By adjusting the distribution of the first lithium iron phosphate particle layer and the second lithium iron phosphate layer, especially when the second lithium iron phosphate particle layer is disposed on the surface of the current collector and when the first lithium iron phosphate particle layer is disposed on an upper portion of the second lithium iron phosphate particle layer, the dynamic performance and cycle performance of the corresponding secondary battery can be further improved.

In any embodiment, optionally, the first lithium iron phosphate particle layer has a thickness of 65 μm to 250 μm, optionally 80 μm to 140 μm, and further optionally 100 μm to 140 μm; and the second lithium iron phosphate particle layer has a thickness of 60 μm to 250 μm, optionally 60 μm to 120 μm, and further optionally 60 μm to 100 μm.

When the thickness of each lithium iron phosphate particle layer is within the above-mentioned range, on the one hand, the cycle performance of the secondary battery can be improved; and on the other hand, the dynamic performance of the secondary battery can be prevented from deteriorating due to an excessively great thickness of the respective layers.

In any embodiment, optionally, a thickness ratio of the first lithium iron phosphate particle layer to the second lithium iron phosphate particle layer is 1:0.1 to 9, optionally 1:0.4 to 1.5, and further optionally 1:0.4 to 1.

When the thickness ratio of the first lithium iron phosphate particle layer to the second lithium iron phosphate particle layer is within the above-mentioned range, the dynamic performance and cycle performance of the corresponding secondary battery can be further improved.

In any embodiment, optionally, the first lithium iron phosphate particle layer has a surface density of 0.1 to 0.3 g/1540.25 $mm^2$, optionally 0.15 to 0.25 g/1540.25 $mm^2$, and further optionally 0.15 to 0.2 g/1540.25 $mm^2$; and the second lithium iron phosphate particle layer has a surface density of 0.1 g to 0.3 g/1540.25 $mm^2$, optionally 0.15 to 0.25 g/1540.25 $mm^2$, and further optionally 0.15 to 0.2 g/1540.25 $mm^2$.

A second aspect of the present disclosure provides a secondary battery. The secondary battery includes the lithium iron phosphate positive electrode plate according to the first aspect of the present disclosure. The secondary battery can be prepared by a common method in the art.

A third aspect of the present disclosure provides a battery module. The battery module includes the secondary battery according to the second aspect of the present disclosure. The battery module can be prepared by a common method in the art.

A fourth aspect of the present disclosure provides a battery pack. The battery pack includes the battery module according to the third aspect of the present disclosure. The battery module can be prepared by a common method in the art.

A fifth aspect of the present disclosure provides an electrical device. The electrical device includes at least one of the secondary battery according to the second aspect of the present disclosure, the battery module according to the third aspect of the present disclosure, or the battery pack according to fourth aspect of the present disclosure. The electrical device can be prepared by a common method in the art.

Beneficial Effects

In the lithium iron phosphate positive electrode plate according to the present disclosure, the first lithium iron phosphate particles having the volume average particle diameter D50 of 60 nm to 300 nm and the specific surface area greater than 15 $m^2/g$, as well as the second lithium iron phosphate particles having the volume average particle diameter D50 greater than 800 nm and the specific surface area smaller than 10 $m^2/g$ are included. On the one hand, the respective advantages of the first lithium iron phosphate particles and the second lithium iron phosphate particles can be fully exerted, thereby improving the dynamic performance and cycle performance of the secondary battery including the positive electrode plate. On the other hand, in the present disclosure, the lithium iron phosphate particles are distinguished based on the specific surface area, thereby avoiding the failure of distinguishing based on a single parameter of the particle diameter, which may be caused by easy agglomeration of the first lithium iron phosphate particles.

According to the present disclosure, the battery module, the battery pack, and the electric device include the secondary battery provided by the present disclosure, and thus they at least have the same advantages as those of the secondary battery.

BRIEF DESCRIPTION OF THE DRAWINGS

As shown in FIG. 1, one single particle of the first lithium iron phosphate particles has a relatively small particle diameter, and a large number of single particles are agglomerated together.

As shown in FIG. 2, the second lithium iron phosphate particles have a relatively great particle diameter and are not easy to be agglomerated.

As shown in FIG. 3, the DCR of the secondary battery corresponding to Example 1 is 18.26 mΩ at −25° C., 10.45 mΩ at −10° C., and 1.72 mΩ at 25° C.

As shown in FIG. 4, the DCR of the secondary battery corresponding to Comparative Example 1 is 24.81 mΩ at −25° C., 13.91 mΩ at −10° C., and 3.14 mΩ at 25° C.

REFERENCE NUMERALS

Figure 1:
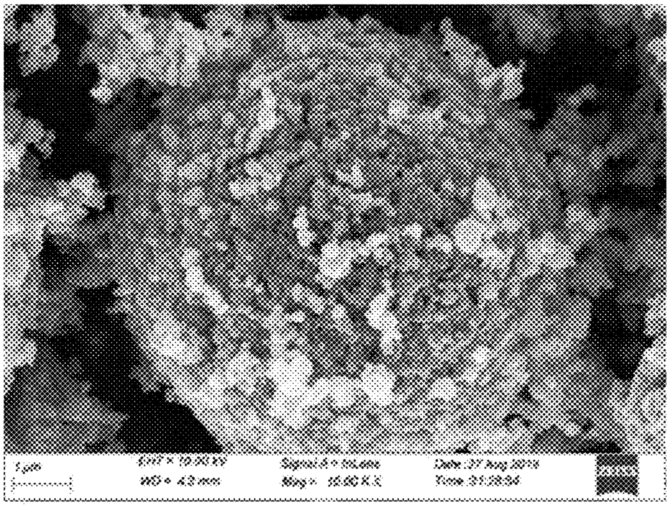
FIG. 1 is a scanning electron micrograph image of first lithium iron phosphate particles according to the present disclosure.
Figure 2:
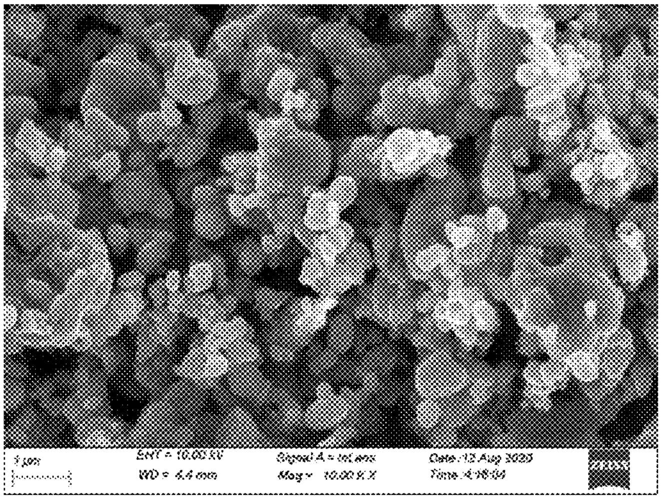
FIG. 2 is a scanning electron micrograph image of second lithium iron phosphate particles according to the present disclosure.
Figure 3:
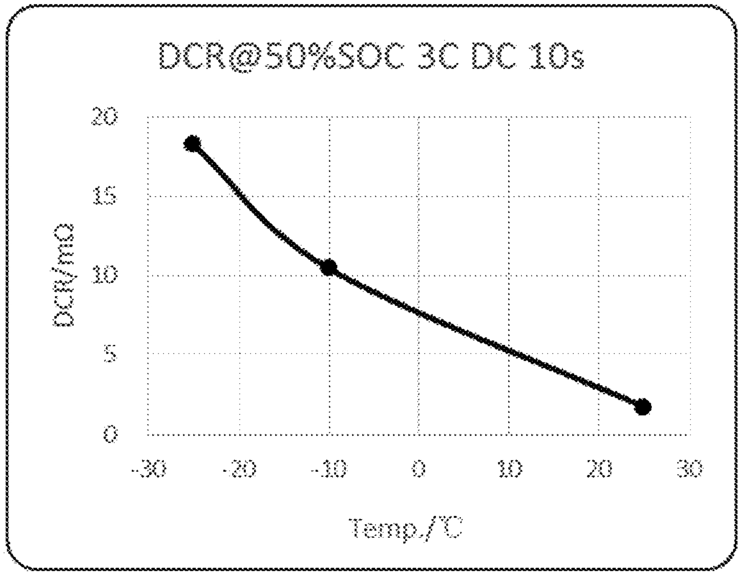
FIG. 3 illustrates direct current resistances (DCRs) at different temperatures of a secondary battery corresponding to Example 1 of the present disclosure.
Figure 4:
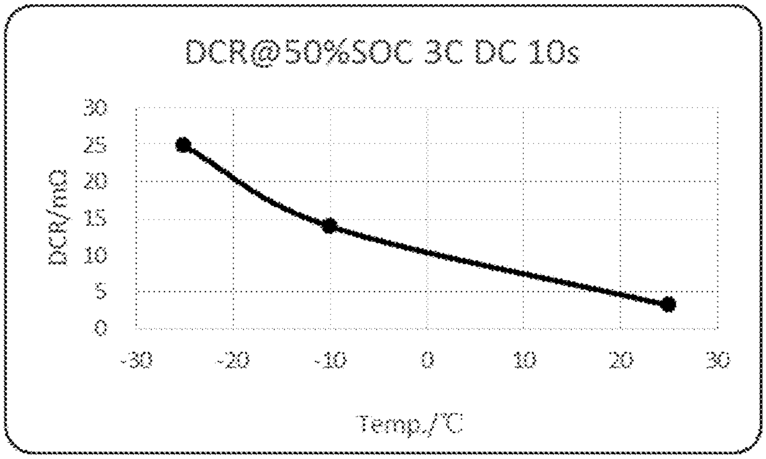
FIG. 4 illustrates direct current resistances (DCRs) at different temperatures of a secondary battery corresponding to Comparative Example 1 of the present disclosure.
Figure 5:
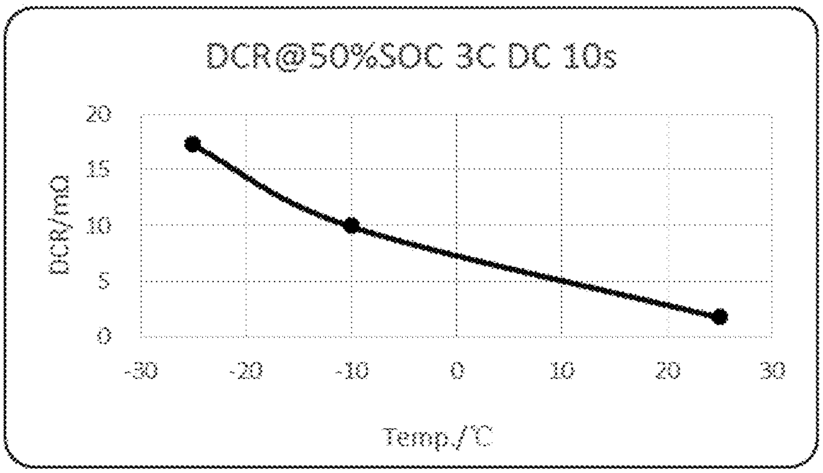
FIG. 5 illustrates direct current resistances (DCRs) at different temperatures of a secondary battery corresponding to Comparative Example 2 of the present disclosure.

1 battery pack; 2 upper box body; 3 lower box body; 4 battery module; 5 secondary battery; 51 housing; 52 electrode assembly; 53 top cover assembly

DETAILED DESCRIPTION

Hereinafter, embodiments of a lithium iron phosphate positive electrode plate, a preparation method thereof, a secondary battery, a battery module, a battery pack, and an electrical device according to the present disclosure are described in detail and specifically explained with reference to the accompanying drawings as appropriate. However, unnecessary detailed illustrations may be omitted in some instances. For example, detailed description of well-known items and repeated description of actually identical structures may be omitted in some instances, in order to avoid the following description being unnecessarily redundant, facilitating understanding by those skilled in the art. Moreover, the accompanying drawings and the following description are provided for enabling those skilled in the art to fully understand the present disclosure, rather than limiting the subject matters recited in claims.

The "ranges" disclosed in the present disclosure are defined in the form of lower and upper limits. A given range is defined by selection of a lower limit and an upper limit, and the selected lower and upper limits defining the boundaries of the particular range. The ranges defined in such a manner may be inclusive or exclusive, and may be arbitrarily combined. That is, any lower limit may be combined with any upper limit to form a range. For example, if the ranges of 60-120 and 80-110 are specified for a particular parameter, it should be understood that the ranges of 60-110 and 80-120 can also be expected. Additionally, if the minimum range values 1 and 2 and the maximum range values 3, 4, and 5 are specified, the following ranges can be expected: 1-3, 1-4, 1-5, 2-3, 2-4 and 2-5. In the present disclosure, unless stated otherwise, the numerical range "a-b" denotes an abbreviated representation of any combination of real numbers between a and b, where both a and b are real numbers. For example, the numerical range "0-5" means that all real numbers between "0-5" have been listed herein, and "0-5" is just an abbreviated representation of combinations of these numerical values. In addition, when a parameter is expressed as an integer of ≥2, it is equivalent to disclose that the parameter is, for example, an integer of 2, 3, 4, 5, 6, 7, 8, 9, 10, 11, 12, etc.

All technical features and optional technical features of the present disclosure can be combined with one another to form a new technical solution, unless otherwise stated.

All technical features and optional technical features of the present disclosure can be combined with one another to form a new technical solution, unless otherwise stated.

Unless otherwise stated, all the steps of the present disclosure can be performed sequentially or randomly, in some embodiments sequentially. For example, the method including steps (a) and (b) indicates that the method may include steps (a) and (b) performed sequentially, or the method may include steps (b) and (a) performed sequentially. For example, reference to "the method may further include step (c)" indicates that step (c) may be added to the method in any order, e.g., the method may include steps (a), (b) and (c), or steps (a), (c) and (b), or steps (c), (a) and (b), etc.

The terms "comprise", "contain", and "include" mentioned in the present disclosure are open-ended, unless otherwise stated. For example, the terms "comprise", "contain", and "include" may mean that other components not listed may or may not also be comprised or included.

The phrases "above a number" and "below a number" the present disclosure include the present number, unless otherwise stated.

In the present disclosure, the term "or" is inclusive unless otherwise stated. For example, the phrase "A or B" means "A, B, or both A and B". More specifically, a condition "A or B" is satisfied by any one of the following: A is true (or present) and B is false (or not present); A is false (or not present) and B is true (or present); or both A and B are true (or present). In this disclosure, the phrases "at least one of A, B, and C" and "at least one of A, B, or C" both mean only A, only B, only C, or any combination of A, B, and C.

It is surprisingly found that the dynamic performance and cycle performance of the corresponding secondary battery can be effectively improved by using the lithium iron phosphate particles having different particle diameters in combination. In addition, the lithium iron phosphate particles are distinguished based on the particle diameter and the specific surface area, thereby avoiding the failure of distinguishing based on a single parameter of the particle diameter, which may be caused by easy agglomeration of the first lithium iron phosphate particles.

Further, it is found that the dynamic performance and cycle performance of the corresponding secondary battery can be further improved by changing the carbon content of the first and second lithium iron phosphate particles, by adjusting the weight ratio of the lithium iron phosphate particles, and further by coating the different lithium iron phosphate particles in different layers and adjusting the thickness of each layer.

[Positive Electrode Plate]

A first aspect of the present disclosure provides a lithium iron phosphate positive electrode plate. The lithium iron phosphate positive electrode plate includes a positive electrode current collector, and a positive electrode active material located on the positive electrode current collector. The positive electrode active material includes: first lithium iron phosphate particles having a volume average diameter D50 of 60 nm to 300 nm, optionally 60 nm to 200 nm, and a specific surface area greater than 15 $m^2/g$, optionally 15 $m^2/g$ to 25 $m^2/g$; and second lithium iron phosphate particles having a volume average diameter D50 greater than 800 nm, optionally 1000 nm to 1500 nm, and a specific surface area smaller than 10 $m^2/g$, optionally 5 $m^2/g$ to 10 $m^2/g$.

The positive electrode plate according to the present disclosure includes the first lithium iron phosphate particles and the second lithium iron phosphate particles. Thus, the advantages of the first lithium iron phosphate particles such as small direct current resistance and good dynamic performance, as well as the advantages of the second lithium iron phosphate particles such as great pressure density and less tendency of gelling can be fully exerted, thereby effectively improving the dynamic performance and cycle performance of the corresponding secondary battery. In addition, according to the present disclosure, the lithium iron phosphate particles are distinguished based on the specific surface area, thereby the failure of distinguishing based on a single parameter of the particle diameter, which may be caused by easy agglomeration of the first lithium iron phosphate particles.

As an example, the positive electrode plate according to the present disclosure includes the positive electrode current collector and the positive electrode active material. The positive electrode current collector has two surfaces opposite to each other in a thickness direction thereof. The positive electrode active material is disposed on any one of or both of the two opposite surfaces of the positive electrode current collector.

In the present disclosure, the volume average particle diameter D50 and the specific surface area may be measured by the common methods known in the art. For example, the particle diameter of D50 may be measured based on the standard GB/T 19077-2016/ISO 13320: 2009, and the specific surface area may be measured based on the standard GB/T 19587-2004, *"Determination of Specific Surface Area of Solids by Gas Adsorption Using the BET Method"*.

In some embodiments, optionally, a content of the first lithium iron phosphate particles ranges from 1% to 97%, optionally from 18% to 68%, and further optionally from 36% to 68%, based on a total weight of a positive electrode film layer in the lithium iron positive electrode plate; and a content of the second lithium iron phosphate particles ranges from 3% to 99%, optionally from 32% to 82%, and further optionally from 32% to 64%, based on the total weight of the positive electrode film layer in the lithium iron phosphate positive electrode plate.

As an example, the content of the first lithium iron phosphate particles may be 19.4%, 38.8%, 48.5%, 58.2%, 64.7%, or 67.9%; and the content of the second lithium iron phosphate particles may be 29.1%, 32.3%, 38.8%, 48.5%, 58.2%, or 77.6%.

When the content of the first lithium iron phosphate particles is excessively high, more first lithium iron phosphate particles may be agglomerated, which is disadvantageous to the large-scale production and the improvement of an energy density. Similarly, when the content of the second lithium iron phosphate particles is excessively high, the dynamic performance of the battery may deteriorate, and thus a battery life may be shortened. When the contents of the two types of the lithium iron phosphate particles are within the above-mentioned ranges, the corresponding secondary battery has a lower direct current resistance and a longer service life.

In some embodiments, optionally, in an active substance layer of the lithium iron phosphate positive electrode plate, a weight ratio of the first lithium iron phosphate particles to the second lithium iron phosphate particles is 1:0.1 to 9, optionally 1:0.4 to 4, and further optionally 1:0.4 to 1.5. For example, the weight ratio of the first lithium iron phosphate particles to the second lithium iron phosphate particles may be 1:4, 2:3, 1:1, 3:2, 2:1, or 7:3.

By adjusting the weight ratio of the first lithium iron phosphate particles to the second lithium iron phosphate particles, the dynamic performance and cycle performance of the corresponding battery can be further improved.

In some embodiments, optionally, a carbon content of the first lithium iron phosphate particles ranges from 1.2% to 2.7%, optionally from 1.4% to 2.2%, and further optionally from 1.4% to 2.0%, based on a total weight of the first lithium iron phosphate particles; and a carbon content of the second lithium iron phosphate particles ranges from 0.7% to 1.3%, optionally from 1% to 1.2%, and further optionally from 1.1% to 1.2%, based on a total weight of the second lithium iron phosphate particles.

When the carbon contents of the two types of the lithium iron phosphate particles are within the above-mentioned ranges, the performance of the corresponding secondary battery can be further improved.

In the present disclosure, the carbon content in the lithium iron phosphate particles can be measured by a common method in the art. For example, the carbon content in the lithium iron phosphate particles can be measured by means of an infrared absorption method. Specifically, the to-be-measured sample is combusted in an oxygen flow to generate $CO_2$. Energy of infrared rays absorbed by $CO_2$ is proportional to the concentration of $CO_2$ under a certain pressure, and thus the carbon content can be calculated based on the measured energy change before and after the $CO_2$ gas flows through an infrared absorber.

In some embodiments, optionally, the first lithium iron phosphate particle powder has a tap density of 1 g $cm^{-3}$ to 1.4 g $cm^{-3}$, optionally 1.1 g $cm^{-3}$ to 1.3 g $cm^{-3}$, and further optionally 1.15 g $cm^{-3}$ to 1.25 g $cm^{-3}$.

In some embodiments, optionally, the second lithium iron phosphate particle powder has a tap density of 1.2 g $cm^{-3}$ to 1.6 g $cm^{-3}$, optionally 1.3 g $cm^{-3}$ to 1.5 g $cm^{-3}$, and further optionally 1.35 g $cm^{-3}$ to 1.45 g $cm^{-3}$.

It should be noted that the tap density of the lithium iron phosphate particle powder may be measured by a method commonly used by those skilled in the art, for example, may be measured based on standard GB/T 5162-2006/ISO3953: 1993.

In some embodiments, optionally, the first lithium iron phosphate particle powder has a compacted density of 2 g/$cm^3$ to 2.2 g/$cm^3$.

In some embodiments, optionally, the second lithium iron phosphate particle powder has a compacted density of 2 g/$cm^3$ to 2.45 g/$cm^3$.

Similarly, the compacted density may be measured by a method commonly used by those skilled in the art. As an example, the compacted density may be measured by the following method: taking a certain amount of powder in a dedicated mold for compaction; placing the mold on a compacted density instrument; setting different pressures; reading thicknesses (the thicknesses after pressure relief) of the powder under different pressures from the instrument; and calculating the compacted density based on $\rho=m/v$.

In some embodiments, optionally, a positive electrode film layer in the lithium iron phosphate positive electrode plate has a compacted density of 2 g/$cm^3$ to 2.45 g/$cm^3$, optionally 2.1 g/$cm^3$ to 2.3 g/$cm^3$, and further optionally 2.15 g/$cm^3$ to 2.25 g/$cm^3$. The compacted density of the positive electrode film layer can be measured by a common method in the art. As an example, the positive electrode plate of a unit area is taken to weigh its weight m1, and a weight m2 of a positive electrode foil material of a unit area is weighed, a weight of the positive electrode film layer is obtained by subtracting m2 from m1, and then the compacted density of the positive electrode film layer can be obtained by dividing the weight of the positive electrode film layer by a thickness of the positive electrode film layer (the thickness of the electrode plate minus the thickness of the foil material).

In some embodiments, optionally, the first lithium iron phosphate particles and the second lithium iron phosphate particles are distributed in layers in an active substance layer in the lithium iron phosphate positive electrode plate.

In some embodiments, optionally, a second lithium iron phosphate particle layer is disposed on a surface of the positive electrode current collector; and a first lithium iron phosphate particle layer is disposed on a surface, opposite to the positive electrode current collector, of the second lithium iron phosphate particle layer.

It will be understood by those skilled in the art that a spatial structure design in terms of the electrode plate also has a significant effect on performance of a lithium secondary battery, especially the design of the electrode plate containing two or more active materials. The performance of the battery can be further improved through the spatial structure design of the electrode plate. Specifically, in the present disclosure, when the two types of the lithium iron phosphate particles are coated and distributed in layers, and particularly, when the second lithium iron phosphate particles are coated on the surface of the positive electrode current collector and the first lithium iron phosphate particles are coated on the surface of the second lithium iron phosphate particle layer to form a double-layer distribution structure, the two types of the lithium iron phosphate particles can more effectively exert their respective advantages, thereby improving the dynamic performance and cycle performance of the secondary battery.

In some embodiments, optionally, the first lithium iron phosphate particle layer has a thickness of 65 μm to 250 μm, optionally 80 μm to 140 μm, and further optionally 100 μm to 140 μm; and the second lithium iron phosphate particle layer has a thickness of 60 μm to 250 μm, optionally 60 μm to 120 μm, and further optionally 60 μm to 100 μm.

As an example, the first lithium iron phosphate particle layer may have a thickness of 80 nm, 100 nm, 120 nm, or 140 nm, and the second lithium iron phosphate particle layer may have a thickness of 60 nm, 80 nm, 100 nm, or 120 nm. The thickness of the first lithium iron phosphate particle layer and the thickness of the second lithium iron phosphate particle layer may be determined by a common method in the art. For example, the thickness of the positive electrode film layer may be measured, and then the thickness of the first lithium iron phosphate particle layer and the thickness of the second lithium iron phosphate particle layer may be determined by a weight ratio relation between the first lithium iron phosphate particles and the second lithium iron phosphate particles.

Excessively great thickness of the lithium iron phosphate particle layer may result in a deterioration of the dynamic performance of the battery. In contrast, excessively small thickness of the lithium iron phosphate particle layer, the advantages of a double-layer coating may not be fully exerted, thereby failing to further improve the performance of the battery.

In some embodiments, optionally, a thickness ratio of the first lithium iron phosphate particle layer to the second lithium iron phosphate particle layer is 1:0.1 to 9, optionally 1:0.4 to 1.5, and further optionally 1:0.4 to 1. For example, a thickness ratio of the first lithium iron phosphate particle layer to the second lithium iron phosphate particle layer may be 2:3, 1:1, 3:2, or 7:3.

When the thickness ratio of the first lithium iron phosphate particle layer to the second lithium iron phosphate particle layer is within the above-mentioned ranges, it is helpful to further improve the dynamic performance and cycle performance of the corresponding secondary battery.

In some embodiments, optionally, the first lithium iron phosphate particle layer has a surface density of 0.1 to 0.3 g/1540.25 $mm^2$, optionally 0.15 to 0.25 g/1540.25 $mm^2$, and further optionally 0.15 to 0.2 g/1540.25 $mm^2$; and the second lithium iron phosphate particle layer has a surface density of 0.1 to 0.3 g/1540.25 $mm^2$, optionally 0.15 to 0.25 g/1540.25 $mm^2$, and further optionally 0.15 to 0.2 g/1540.25 $mm^2$.

It should be noted that, the coating method is not particularly limited in the present disclosure, and a coating method commonly used in the art may be used, for example, blade coating, roller coating, slot-die coating, etc.

In some embodiments, the positive electrode current collector may be a metal foil or a composite current collector. For example, as the metal foil, an aluminum foil may be used. The composite current collector may include a polymer material substrate and a metal layer formed on at least one surface of the polymer material substrate. The composite current collector may be formed by forming a metal material (e.g., aluminum, aluminum alloy, nickel, nickel alloy, titanium, titanium alloy, silver, silver alloy) on a polymer material substrate (e.g., polypropylene (PP), polyethylene terephthalate (PET), polybutylene terephthalate (PBT), polystyrene (PS), polyethylene (PE)).

In some embodiments, optionally, the lithium iron phosphate positive electrode plate further includes a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorinated acrylate acid vinegar resin.

In some embodiments, optionally, the binder accounts for 0.1% to 3.5%, and optionally 0.5% to 2.5%, of a total weight of the positive electrode film layer.

In some embodiments, optionally, the lithium iron phosphate positive electrode plate further includes a conductive agent. As an example, the conductive agent may include at least one of superconducting carbon, acetylene black, carbon black, Ketjen black, carbon dots, carbon nanotubes, graphene, and carbon nanofibers.

In some embodiments, optionally, the conductive agent accounts for 0.05% to 2.0%, and optionally 0.1% to 1.5%, of the total weight of the positive electrode film layer.

In some embodiments, optionally, the lithium iron phosphate positive electrode plate further includes other additives, e.g., a surfactant, a wetting agent, a rheology modifier, etc. As an example, the additive may be selected from, for example, one or more of higher fatty acid salt, higher alkyl sulfonate, alkyl aryl sulfonate, alkali metal salts of lauric acid, myristic acid, palmitic acid, stearic acid and oleic acid, etc., such as lithium salt, perfluoroalkyl sulfonimide salt, methyl caprylate, n-butyl neopentanoate, or lauryl acetate.

In some embodiments, optionally, the other additives account for 0.05% to 2.0%, and optionally 0.1% to 1.5%, of the total weight of the positive electrode film layer.

In some embodiments, the positive electrode plate may be prepared as follows: dispersing components for preparing the positive electrode plate, for example, the first lithium iron phosphate particles and the second lithium iron phosphate particles, the conductive agent, the binder, and any other components such as the surfactant into a solvent (e.g., N-methylpyrrolidone) to form positive electrode slurry; and coating the positive electrode slurry on the positive electrode current collector; and obtaining the positive electrode plate subsequent to procedures such as drying, cold pressing.

In some embodiments, optionally, positive electrode slurry of the first lithium iron phosphate particles and positive electrode slurry of the second lithium iron phosphate particles can be separately prepared; the positive electrode slurry of the second lithium iron phosphate particles is coated on a side close to the current collector; and the positive electrode slurry of the first lithium iron phosphate particles is coated on a surface of the second lithium iron phosphate particle layer facing away from the current collector.

In some embodiments, optionally, during the preparation of the positive electrode slurry, the positive electrode slurry can be delivered immediately once the mixture is stirred to reach a viscosity of 7000 mPa·s to 15000 mPa·s.

[Secondary Battery]

A second aspect of the present disclosure provides a secondary battery. The secondary battery includes the lithium iron phosphate positive electrode plate according to the first aspect of the present disclosure. The secondary battery may be prepared by a common method in the art. For example, a positive electrode plate, a negative electrode plate, and a separator can be wound into an electrode assembly by means of a certain process, the obtained electrode assembly is injected with electrolyte, and through a procedure such as sealing, the secondary battery according to the present disclosure can be prepared.

Generally, the secondary battery includes the positive electrode plate, the negative electrode plate, the electrolyte, and the separator. In charge and discharge processes of the battery, active ions are embedded and disengaged back and forth between the positive electrode plate and the negative electrode plate. The electrolyte is configured to conduct the ions between the positive electrode plate and the negative electrode plate. The separator is disposed between the positive electrode plate and the negative electrode plate, and is mainly configured to prevent short circuits of the positive electrode and the negative electrode and enable the ions to pass through.

Other components of the secondary battery, such as the negative electrode plate, the electrolyte, and the separator, are described as follows.

[Negative Electrode Plate]

The negative electrode plate includes a negative electrode current collector and a negative electrode film layer disposed on at least one surface of the negative electrode current collector. The negative electrode film layer includes a negative electrode active material.

As an example, the negative electrode current collector has two opposite surfaces in a thickness direction thereof, and the negative electrode film layer is disposed on any one or both of the two opposite surfaces of the negative electrode current collector.

In some embodiments, the negative electrode current collector may be a metal foil or a composite current collector. For example, a copper foil may be used as the metal foil. The composite current collector may include a polymer material substrate and a metal layer formed on the at least one surface of a polymer material substrate. The composite current collector may be formed by forming a metal material (copper, copper alloy, nickel, nickel alloy, titanium, titanium alloy, silver, silver alloy, etc.) on the polymer material substrate (e.g., a substrate material of polypropylene (PP), polyethylene terephthalate (PET), polybutylene terephthalate (PBT), polystyrene (PS), or polyethylene (PE)).

In some embodiments, the negative electrode active material may be the negative electrode active material for the battery known in the art. As an example, the negative electrode active material may include at least one of the following materials: artificial graphite, natural graphite, soft carbon, hard carbon, a silicon-based material, a tin-based material, or lithium titanate, etc. The silicon-based material may be selected from at least one of elemental silicon, silicon oxide, silicon-carbon composite, silicon-nitrogen composite, and silicon alloy. The tin-based material may be selected from at least one of elemental tin, tin oxide, and tin alloy. However, the present disclosure is not limited to these materials, and other conventional materials that can be used as the negative electrode active material of the battery may also be used. These negative electrode active materials may be used individually or in combination of more than two thereof.

In some embodiments, the negative electrode film layer may further optionally include a binder. The binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer may further optionally include a conductive agent. The conductive agent may be selected from at least one of superconducting carbon, acetylene black, carbon black, Ketjen black, carbon dots, carbon nanotubes, graphene, and carbon nanofibers.

In some embodiments, the negative electrode film layer may optionally include other additives, for example, a thickening agent (e.g., sodium carboxymethyl cellulose (CMC-Na)).

In some embodiments, the negative electrode plate may be prepared as follows: dispersing the components for preparing the negative electrode plate such as a negative electrode active material, a conductive agent, a binder, and any other components into a solvent (e.g., deionized water) to form negative electrode slurry; coating the negative electrode slurry on the negative electrode current collector; and obtaining the negative electrode plate subsequent to procedures such as drying, cold pressing.

[Electrolyte]

The electrolyte plays a role in conducting the ions between the positive electrode plate and the negative electrode plate. The type of the electrolyte is not specifically limited in the present disclosure, and the electrolyte may be selected based on actual requirements. For example, the electrolyte may be in a liquid state, a gel state, or an all-solid state.

In some embodiments, the electrolyte is an electrolyte solution. The electrolyte solution includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro(oxalate)borate, lithium bis(oxalato)borate, lithium bis(oxyaly)difluorophosphate, and lithium tetrafluoro(oxalato)phosphate.

In some embodiments, the solvent may be selected from at least one of ethylene carbonate, propylene carbonate, methyl ethyl carbonate, diethyl carbonate, dimethyl carbonate, dipropyl carbonate, methyl propyl carbonate, ethyl propyl carbonate, butylene carbonate, fluoroethylene carbonate, methyl formate, ethyl formate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone, or diethyl sulfone.

In some embodiments, the electrolyte solution may further optionally include an additive. For example, the additive may include a negative electrode film-forming additive and a positive electrode film-forming additive. The additive may further include an additive capable of improving certain performances of the battery, for example, an additive capable of improving overcharge performance of the battery, an additive capable of improving high-temperature or low-temperature performance of the battery, etc.

[Separator]

In some embodiments, the secondary battery further includes a separator. A type of the separator is not specifically limited in the present disclosure, and any well-known porous structure separator with good chemical stability and mechanical stability may be selected.

In some embodiments, a material of the separator may be selected from at least one of glass fiber, non-woven fabric, polyethylene, polypropylene, or polyvinylidene fluoride. The separator may be a single-layer thin film or a multi-layer composite thin film, which is not particularly limited. When the separator is the multi-layer composite thin film, the materials of the layers may be the same or different, which is not particularly limited.

A third aspect of the present disclosure provides a battery module. The battery module includes the secondary battery according to the second aspect of the present disclosure.

A fourth aspect of the present disclosure provides a battery pack. The battery pack includes the battery module according to the third aspect of the present disclosure.

A fifth aspect of the present disclosure provides an electrical device. The electrical device includes at least one of the secondary battery according to the second aspect of the present disclosure, the battery module according to the third aspect of the present disclosure, or the battery pack according to the fourth aspect of the present disclosure. The secondary battery, the battery module, or the battery pack may be used as a power supply of the electric device, and may also be used as an energy storage unit of the electric device. The electric device may include, but not limited to, a mobile apparatus (e.g., a mobile phone, a notebook computer), an electric vehicle (e.g., a pure electric vehicle, a hybrid electric vehicle, a plug-in hybrid electric vehicle, an electric bicycle, an electric scooter, an electric golf cart, an electric truck), an electrical train, a ship, a satellite, an energy storage system, etc.

The secondary battery, the battery module, or the battery pack may be selected as the electrical device based on a use demand thereof.

In addition, the secondary battery, the battery module, the battery pack, and the electrical device of the present disclosure are described below with reference to the accompanying drawings as appropriate.

In some embodiments, the secondary battery may include an outer package. The outer package may be configured to encapsulate the electrode assembly and the electrolyte.

In some embodiments, the outer package of the secondary battery may be a hard shell, such as a hard plastic shell, an aluminum shell, a steel shell, etc. The outer package of the secondary battery may also be a soft bag, such as a pouch-type soft bag. A material of the soft package may be plastics. Examples of plastics may include polypropylene, polybutylene terephthalate, polybutylene succinate, etc.

Figure 6:
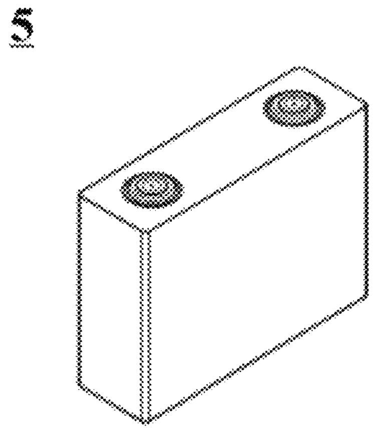
FIG. 6 is a schematic diagram of a secondary battery according to an embodiment of the present disclosure.

A shape of the secondary battery is not specifically limited in the present disclosure, and the secondary battery may be cylindrical, square, or any other shape. For example, FIG. 6 illustrates an example of a secondary battery 5 with a square structure.

Figure 7:
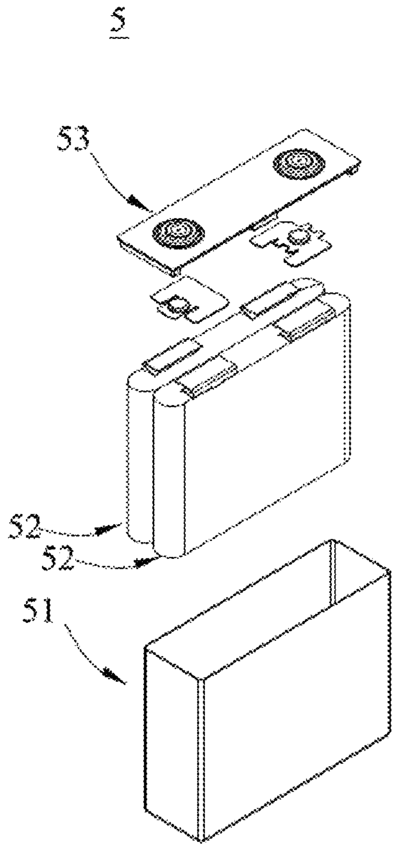
FIG. 7 is an exploded view of a secondary battery according to an embodiment of the present disclosure illustrated in FIG. 6.

In some embodiments, referring to FIG. 7, the outer package may include a housing 51 and a cover plate 53. The housing 51 may include a bottom plate and a side plate connected to the bottom plate, and an accommodating cavity is enclosed by the bottom plate and the side plate. The housing 51 has an opening in communication with the accommodating cavity, and the cover plate 53 can be disposed on and cover the opening to close the accommodating cavity. The positive electrode plate, the negative electrode plate, and the separator may be subjected to a winding process or a stacking process to form an electrode assembly 52, and the electrode assembly 52 is encapsulated in the accommodating cavity. The electrolyte solution is infiltrated into the electrode assembly 52. The electrode assembly 52 may include one or more the secondary batteries 5, which may be selected by those skilled in the art based on the actual requirements.

In some embodiments, the secondary battery may be assembled into the battery module. The battery module may include one or more secondary batteries, and the exact number may be selected by those skilled in the art based on usage and capacity of the battery module.

Figure 8:
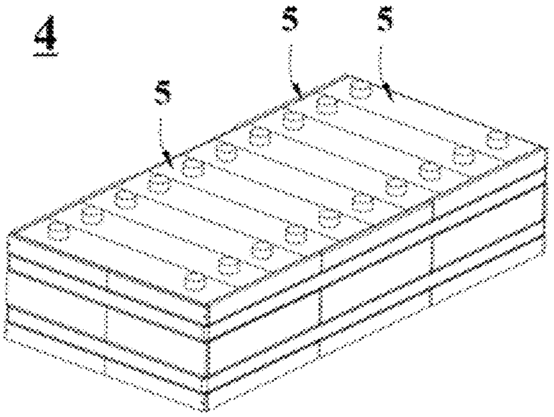
FIG. 8 is a schematic diagram of a battery module according to an embodiment of the present disclosure.

FIG. 8 illustrates an example of a battery module 4. Referring to FIG. 8, in the battery module 4, a plurality of secondary batteries 5 can be sequentially arranged in a length direction of the battery module 4. The plurality of secondary batteries 5 may also be arranged in any other manner. The plurality of secondary batteries 5 may be further fixed by a fastener.

Optionally, the battery module 4 may further include a casing having accommodating space, and the plurality of secondary batteries 5 is accommodated in the accommodating space.

In some embodiments, the battery module may also be assembled into the battery pack. The battery pack may include one or more battery modules, and the exact number may be selected by those skilled in the art based on usage and capacity of the battery pack.

Figure 9:
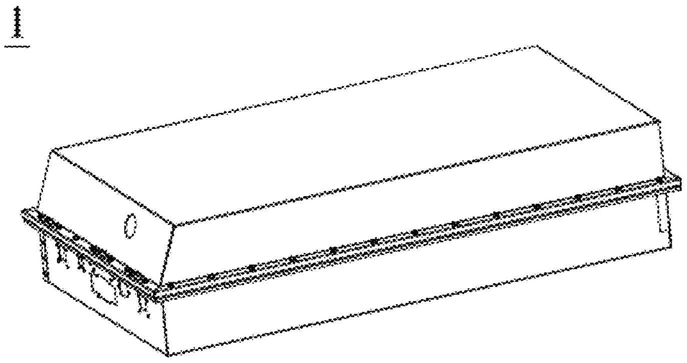
FIG. 9 is a schematic diagram of a battery pack according to an embodiment of the present disclosure.
Figure 10:
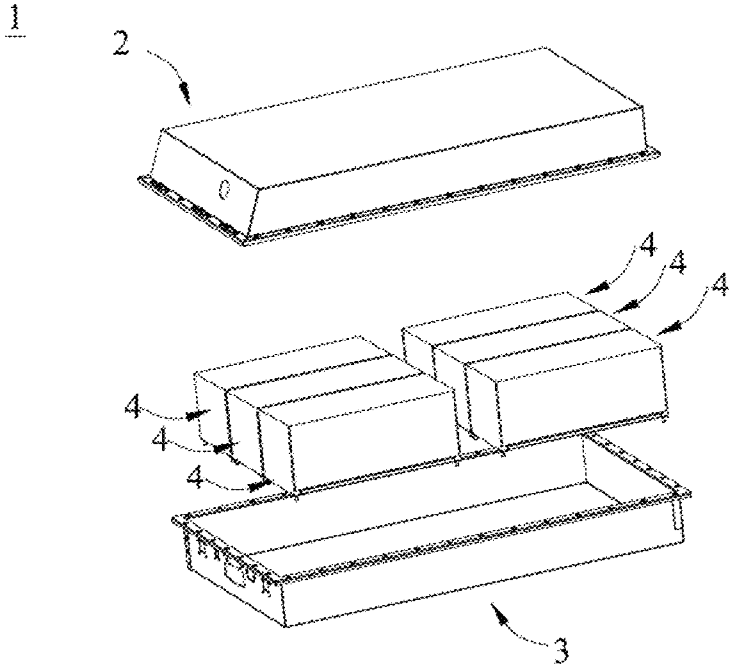
FIG. 10 is an exploded view of a battery pack according to an embodiment of the present disclosure illustrated in FIG. 9.

FIG. 9 and FIG. 10 illustrate an example of a battery back. Referring to FIG. 9 and FIG. 10, the battery pack 1 may include a battery box and a plurality of battery modules 4 disposed in the battery box. The battery box includes an upper box body 2 and a lower box body 3. The upper box body 2 can be disposed on and cover the lower box body 3 to form a closed space for accommodating the battery modules 4. The plurality of battery modules 4 may be arranged within the battery box in any manner.

Figure 11:
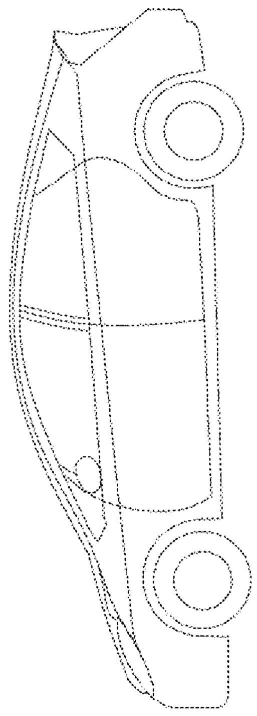
FIG. 11 is a schematic diagram of an electrical device using a secondary battery as a power supply according to an embodiment of the present disclosure.

FIG. 11 illustrates an example of an electrical device. The electric device may be a pure electric vehicle, a hybrid electric vehicle, or a plug-in hybrid electric vehicle, etc. In order to meet requirements of the electrical device for high power and high energy density of the secondary battery, the battery pack or the battery module may be used.

Another example of the device may be a mobile phone, a tablet computer, a notebook computer, etc. The device is generally required to be thin and light, and a secondary battery may be used as a power supply.

EXAMPLES

Hereinafter, the examples of the present disclosure will be explained. The examples described below are exemplary and are merely for explaining the present disclosure, and they should not be construed as limiting the present disclosure. In the examples, techniques or conditions that are not specified shall be based on the techniques or conditions described in literature in the art or according to the product introduction. The used reagents or instruments without indicating the manufacturers are all conventional and commercially available products.

The cathode active materials involved in the examples of the present disclosure are listed in the following table.

| Name | Specification | Manufacturer |
|---|---|---|
| lithium iron phosphate | D50: 300 nm, BET: 15.8 $m^2/g$, carbon content: 1.4%;<br>D50: 250 nm, BET: 20 $m^2/g$, carbon content: 1.5%;<br>D50: 200 nm, BET: 24 $m^2/g$, carbon content: 1.7%; | Hubei WanRun New Energy Technology Co., Ltd |

-continued

| Name | Specification | Manufacturer |
|---|---|---|
| | D50: 100 nm, BET: 25 $m^2/g$, carbon content: 1.9%; D50: 60 nm, BET: 28 $m^2/g$, carbon content: 2.7%. D50: 1000 nm, BET: 10 $m^2/g$, carbon content: 1.2%; D50: 1500 nm, BET: 8 $m^2/g$, carbon content: 1.1%; D50: 1600 nm, BET: 7 $m^2/g$, carbon content: 1.1%; D50: 2000 nm, BET: 6 $m^2/g$, carbon content: 1.0%. | Xiamen Tungsten Co., Ltd. |
| Polyvinylidene fluoride (PVDF) | CAS: 24937-79-9, heavy average molecular weight 900,000 | Shanghai Macklin Biochemical Co., Ltd |
| N-methyl-pyrrolidone (NMP) | CAS: 872-50-4 | Shanghai Macklin Biochemical Co., Ltd |
| Ethylene carbonate (EC) | CAS: 96-49-1 | Shanghai Macklin Biochemical Co., Ltd |
| Dimethyl Carbonate (DMC) | CAS: 616-38-6 | Shanghai Macklin Biochemical Co., Ltd |

Example 1

Preparation of Positive Electrode Plate

The first lithium iron phosphate particles (D50 of 300 nm, BET of 15.8 $m^2/g$, and carbon content of 1.4%), the second lithium iron phosphate particles (D50 of 1000 nm, BET of 10 $m^2/g$, carbon content of 1.2%), polyvinylidene fluoride (PVDF) and conductive agent acetylene black were added in a weight ratio of 48.5%:48.5%:2.2:0.8 into a stirring tank for mixing. The mixture was stirred for 15 minutes at a revolution speed of 25 rpm and a rotation speed of 800 rpm. Solvent N-methylpyrrolidone (NMP) was added into the dry mixture based on a solid content of 60%, and stirred for 15 minutes at the revolution speed of 25 rpm and a rotation speed of 300 rpm. The revolution speed was adjusted to be 25 rpm and the rotation speed was adjusted to be 1,200 rpm, and the mixture was stirred for 220 minutes to be dispersed uniformly. The mixture was continuously stirred at the revolution speed of 25 rpm and a rotation speed of 500 rpm, until a viscosity of the mixture was adjusted to be 10000 mPa·s, and then the mixture was immediately delivered to obtain mixed slurry. The above mixed slurry was coated, based on a surface density of 0.3 $g/mm^2$, on both surfaces of an aluminum foil having a thickness of 13 μm. The solvent was removed by drying, and cooling was performed, such that the positive electrode film layer has a compacted density of 2.2 g/cm3. The positive electrode plate of the example 1 was obtained after cutting.

Preparation of Negative Electrode Plate

Negative electrode active substances: artificial graphite, a conductive agent acetylene black, a binder styrene-butadiene rubber (SBR), and a dispersant sodium carboxymethyl cellulose (CMC-Na) in a weight ratio of 96:1:2:1 were dissolved in solvent deionized water, and stirred and mixed uniformly to prepare the negative electrode slurry. The negative electrode slurry with a coating density of 9.7 $mg/cm^2$ was uniformly coated on a negative electrode current collector copper foil, and the negative electrode plate was obtained by drying, cold pressing, and slicing.

Electrolyte Solution

In an argon atmosphere glove box ($H_2O$<0.1 ppm, $O_2$<0.1 ppm), organic solvents ethylene carbonate (EC)/methyl ethyl carbonate (EMC) were uniformly mixed in a volume ratio of 3 to 7. 12.5% by weight of $LiPF_6$ (based on a weight of the ethylene carbonate/the methyl ethyl carbonate solvent) was added to dissolve in the above organic solvent. The mixture was uniformly stirred to obtain the electrolyte solution.

Separator

Commercially available PP-PE copolymer microporous film having a thickness of 16 m and an average pore diameter of 80 nm were used (from Advanced Electronic Technology Co., Ltd. Model 20).

Secondary Battery

The positive electrode plate, the separator, and the negative electrode plate were stacked in sequence, enabling the separator to be disposed between the positive electrode plate and the negative electrode plate to play a role of isolation, and they were wound to obtain a cylindrical bare cell having a height of 146 mm and a diameter from upper surface to lower surface of 44.8 mm. A spacing between the positive electrode plate and the negative electrode plate was 16 μm, and a spacing between the separator and each of the positive electrode plate and the negative electrode plate was about 0 μm. The bare battery cell was placed in an outer package, and 100 g of the electrolyte solution was injected and packaged to obtain the secondary battery.

Example 2 to Example 11

Conditions of Example 2 to Example 11 were substantially the same as those of Example 1, except the differences in the particle diameter, specific surface area and carbon content of the first lithium iron phosphate particles and the second lithium iron phosphate particles and the weight of the lithium iron phosphate particles. The specific conditions are listed in Table 1.

Example 12

Conditions of Example 12 are basically the same as those of Example 1, except the following differences: the first lithium iron phosphate particles were added into the stirring tank in a weight ratio of the first lithium iron phosphate particles:polyvinylidene fluoride (PVDF): the conductive agent acetylene black of 97:2.2:0.8 to prepare a slurry; the slurry was coated, based on a surface density of 0.3 g/1540 25 $mm^2$, on a surface of an aluminum foil having a thickness of 13 μm, as a first active material layer; then the second lithium iron phosphate particles were added into the stirring tank in a weight ratio of the second lithium iron phosphate particles:polyvinylidene fluoride (PVDF): the conductive agent acetylene black of 97:2.2:0.8 to prepare a slurry; and then the slurry was coated, based on the surface density of 0.3 g/1540. 25 $mm^2$, on an upper surface of the first active material layer.

The weight of the first lithium iron phosphate particles and the weight of the second lithium iron phosphate particles are the same as those of Example 1, that is, the total weight of the upper and lower layers is the same as that of the Example 1. On the obtained positive electrode plate, the first lithium iron phosphate particle layer has a thickness of 100 μm, and the second lithium iron phosphate particle layer has a thickness of 100 μm.

Example 13

Conditions of Example 13 are basically the same as those of Example 12, except that the second lithium iron phosphate particles were coated on the surface of the aluminum foil to serve as the first active material layer, and the first lithium iron phosphate particle layer was coated on the upper portion of the second lithium iron phosphate particle layer.

Example 14 to Example 16

Conditions of Example 14 to Example 16 are basically the same as those of Example 13, except that the weight of the lithium iron phosphate particles was changed to enable the first lithium iron phosphate particle layer/the second lithium iron phosphate particle layer to have the thicknesses of 80 μm/120 μm, 120 μm/80 μm, and 140 μm/60 μm, respectively. The specific conditions are listed in the Table 1.

Comparative Example 1 to Comparative Example 3

Conditions of Comparative example 1 to Comparative example 3 are basically the same as those of Example 1, except the differences in the particle diameter, specific surface area and carbon content of the first lithium iron phosphate particles and the second lithium iron phosphate particles and the weight of the lithium iron phosphate particles. The specific conditions are listed in Table 1.

Comparative Example 4

Conditions of Comparative example 4 are basically the same as those of Example 13, except that the thickness of the first lithium iron phosphate particle layer/the thickness of the second lithium iron phosphate particle layer were 16 μm and 84 μm, respectively. Test methods of related parameters 1. Scanning Electron Microscope Test A proper amount of to-be-tested lithium iron phosphate particles were prepared as samples, and the morphologies of the samples were observed with a ZEISS sigma 300 scanning electron microscope in accordance with the standard JY/T010-1996.

2. Volume Average Particle Diameter D50 Test

The standard GB/T 19077-2016/ISO 13320: 2009, Particle Size Distribution Laser Diffraction Method, was used as a reference. A laser particle size analyzer (MasterSizer 3000) was used for testing, and a helium-neon red light source was used as a primary light source. 1 g of a to-be-tested sample was added into a small clean beaker, 20 mL of deionized water (to ensure 8% to 12% shade rate by concentration of the sample) was added into the beaker, and a drop of a surfactant was added into the beaker to reduce a surface tension of the water to facilitate infiltration of the particles. The sample was subjected to ultrasound for 5 min at 53 KHz/120 W to ensure that the sample was completely dispersed. The laser particle size analyzer was turned on, and after an optical path system was cleaned, a background was automatically tested. The to-be-tested solution that has been subjected to the ultrasound was stirred to be uniformly dispersed, and the solution was put into a sample pool as required to start to measure the particle diameter. A measurement result can be read from the instrument.

3. BET Test

The test method refers to the standard GB/T 19587-2004, *"Determination of Specific Surface Area of Solids by Gas Adsorption Using the BET Method.*

4. DCR Test

A battery was taken for a charge and discharge test. The battery was fully charged at 25° C. first, and left to stand for 30 minutes after fully charged. The battery was discharged at a discharge rate of 1 C for 30 minutes, and left to stand for 10 minutes when adjusted to 50% SOC. A temperature of an incubator was adjusted to −10° C., and the battery was left to stand for 120 minutes to measure an initial discharge voltage. The battery was discharged for 10 seconds at a discharge rate of 3 C, and a lowest voltage in the discharge process was recorded, and then the battery was left to stand for 10 minutes. The DCR was obtained by dividing a difference between the initial discharge voltage of the 3 C discharge and the lowest voltage in the 3 C discharge process by a current value (a discharge rate of 3 C, and a current of 78 A).

5. Cycle Performance Test

At 25° C., the secondary batteries prepared according to the examples and comparative examples were charged to 3.65 V at a constant current rate of 1 C (i.e., a current value at which a theoretical capacity was completely released within 1 hour), then charged to a current of 0.05 C at a constant voltage of 3.65 V, and left to stand for 5 minutes, and discharged to 2.5 V at a constant current rate of 1 C, and left to stand for 30 minutes, which was a charge and discharge cycle. A capacity C0 of the battery at this moment was recorded. The battery was charged and discharged for n cycles in this way, and a capacity of the battery after n cycles was recorded as C1. A cycle capacity retention rate of the battery at 25° C.=C1/C0×100%. A cycle number n, corresponding to that the measured cycle capacity retention rate of the battery was 80%, was recorded.

TABLE 1

Conditions Examples 1 to 12 and Comparative Examples 1 to 6 and performance of corresponding secondary batteries

| | First lithium iron phosphate particles | | | | Second lithium iron phosphate particles | | | | Battery performance | |
|---|---|---|---|---|---|---|---|---|---|---|
| Number | D50/ nm | BET/ $m^2 \cdot g^{-1}$ | Carbon content/wt % | Weight/ wt % | D50/ nm | BET/ $m^2 \cdot g^{-1}$ | Carbon content/wt % | Weight/ wt % | DCR/ mΩ | Service life/cycle |
| Example 1 | 300 | 15.8 | 1.4 | 48.5 | 1000 | 10 | 1.2 | 48.5 | 10.45 | 5000 |
| Example 2 | 250 | 20 | 1.5 | 48.5 | 1000 | 10 | 1.2 | 48.5 | 9 | 5300 |

TABLE 1-continued

Conditions Examples 1 to 12 and Comparative Examples 1 to 6 and performance of corresponding secondary batteries

| | First lithium iron phosphate particles | | | | Second lithium iron phosphate particles | | | | Battery performance | |
|---|---|---|---|---|---|---|---|---|---|---|
| Number | D50/ nm | BET/ $m^2 \cdot g^{-1}$ | Carbon content/wt % | Weight/ wt % | D50/ nm | BET/ $m^2 \cdot g^{-1}$ | Carbon content/wt % | Weight/ wt % | DCR/ mΩ | Service life/cycle |
| Example 3 | 200 | 24 | 1.7 | 48.5 | 1000 | 10 | 1.2 | 48.5 | 8 | 5500 |
| Example 4 | 100 | 28 | 1.9 | 48.5 | 1000 | 10 | 1.2 | 48.5 | 6 | 5500 |
| Example 5 | 60 | 25 | 2.7 | 48.5 | 1000 | 10 | 1.2 | 48.5 | 8 | 5500 |
| Example 6 | 250 | 20 | 1.5 | 48.5 | 1500 | 8 | 1.1 | 48.5 | 9.5 | 5100 |
| Example 7 | 250 | 20 | 1.5 | 48.5 | 2000 | 6 | 1.0 | 48.5 | 10.2 | 4900 |
| Example 8 | 300 | 15.8 | 1.4 | 38.8 | 1000 | 10 | 1.2 | 58.2 | 12 | 4600 |
| Example 9 | 300 | 15.8 | 1.4 | 58.2 | 1000 | 10 | 1.2 | 38.8 | 7 | 5600 |
| Example 10 | 300 | 15.8 | 1.4 | 64.67 | 1000 | 10 | 1.2 | 32.33 | 6.5 | 5500 |
| Example 11 | 300 | 15.8 | 1.4 | 19.4 | 1000 | 10 | 1.2 | 77.6 | 14 | 4000 |
| Example 12[1] | 300 | 15.8 | 1.4 | 48.5 | 1000 | 10 | 1.2 | 48.5 | 12 | 4500 |
| Example 13[2] | 300 | 15.8 | 1.4 | 48.5 | 1000 | 10 | 1.2 | 48.5 | 9 | 5500 |
| Example 14[3] | 300 | 15.8 | 1.4 | 38.8 | 1000 | 10 | 1.2 | 58.2 | 10 | 5000 |
| Example 15[4] | 300 | 15.8 | 1.4 | 58.2 | 1000 | 10 | 1.2 | 38.8 | 7 | 5600 |
| Example 16[5] | 300 | 15.8 | 1.4 | 67.9 | 1000 | 10 | 1.2 | 29.1 | 6 | 5900 |
| Comparative example 1 | — | — | — | — | 1000 | 10 | 1.2 | 97 | 13.91 | 4000 |
| Comparative example 2 | 300 | 15.8 | 1.4 | 48.5 | 1600 | 7 | 1.2 | 48.5 | 12 | 4600 |
| Comparative example 3 | 300 | 15.8 | 1.4 | 7.76 | 1000 | 10 | 1.2 | 89.24 | 14.5 | 4300 |
| Comparative example 4[6] | 300 | 15.8 | 1.4 | 7.76 | 1000 | 10 | 1.2 | 89.24 | 14.5 | 4100 |

[1]the first lithium iron phosphate particle layer located in the lower portion, the second lithium iron phosphate particle layer located in the upper portion, the thickness ratio of the upper layer to the lower layer of 1:1;
[2]the first lithium iron phosphate particle layer located in the upper portion, the second lithium iron phosphate particle layer located in the lower portion, the thickness ratio of the upper layer to the lower layer of 1:1;
[3]the first lithium iron phosphate particle layer located in the upper portion, the second lithium iron phosphate particle layer located in the lower portion, the thickness ratio of the upper layer to the lower layer of 2:3
[4]the first lithium iron phosphate particle layer located in the upper portion, the second lithium iron phosphate particle layer located in the lower portion, the thickness ratio of the upper layer to the lower layer of 3:2
[5]the first lithium iron phosphate particle layer located in the upper portion, the second lithium iron phosphate particle layer located in the lower portion, the thickness ratio of the upper layer to the lower layer of 7:3
[6]the first lithium iron phosphate particles layer located in the upper portion, the second lithium iron phosphate particles layer located in the lower portion, the thickness ratio of the upper layer to the lower layer of 0.8:9.2.

The above results indicate that the secondary batteries prepared in the Example 1 to Example 16 of the present disclosure has the smaller DCR and the better cycle performance than those of the batteries in Comparative examples 1 to 4. In addition, by adjusting the weight and the spatial distribution of the first lithium iron phosphate particles and the second lithium iron phosphate particles, the dynamic performance and cycle performance of the secondary battery can be further improved.

It should be noted that the present disclosure is not limited to the above embodiments. The above embodiments are exemplary only, and any embodiment that has substantially same constitutions as the technical concepts and has the same effects within the scope of the technical solutions of the present disclosure shall fall within the technical scope of the present disclosure. Furthermore, various modifications to the embodiments that can be conceived by those skilled in the art, and other implementations constructed by combining some of the constituent elements of the embodiments shall also fall within the scope of the present disclosure without departing from the spirit of the present disclosure.

What is claimed is:

1. A lithium iron phosphate positive electrode plate, comprising:

a positive electrode current collector; and a positive electrode active material located on the positive electrode current collector, wherein the positive electrode active material comprises:

first lithium iron phosphate particles having a volume average diameter D50 of 60 nm to 300 nm, and a specific surface area greater than 15 $m^2/g$; and second lithium iron phosphate particles having a volume average diameter D50 greater than 800 nm, and a specific surface area smaller than 10 $m^2/g$.

2. The lithium iron phosphate positive electrode plate according to claim 1, wherein:

a content of the first lithium iron phosphate particles ranges from 1% to 97%, based on a total weight of a positive electrode film layer in the lithium iron positive electrode plate; and a content of the second lithium iron phosphate particles ranges from 3% to 99%, based on the total weight of the positive electrode film layer in the lithium iron phosphate positive electrode plate.

3. The lithium iron phosphate positive electrode plate according to claim 1, wherein in an active substance layer of the lithium iron phosphate positive electrode plate, a weight ratio of the first lithium iron phosphate particles to the second lithium iron phosphate particles is 1:0.1 to 9.

4. The lithium iron phosphate positive electrode plate according to claim 1, wherein:

a carbon content of the first lithium iron phosphate particles ranges from 1.2% to 2.7%, based on a total weight of the first lithium iron phosphate particles; and a carbon content of the second lithium iron phosphate particles ranges from 0.7% to 1.3%, based on a total weight of the second lithium iron phosphate particles.

5. The lithium iron phosphate positive electrode plate according to claim 1, wherein a positive electrode film layer in the lithium iron phosphate positive electrode plate has a compacted density of 2 $g/cm^3$ to 2.45 $g/cm^3$.

6. The lithium iron phosphate positive electrode plate according to claim 1, wherein the first lithium iron phosphate particles and the second lithium iron phosphate particles are distributed in layers in an active substance layer in the lithium iron phosphate positive electrode plate.

7. The lithium iron phosphate positive electrode plate according to claim 6, wherein:

a second lithium iron phosphate particle layer is disposed on a surface of the positive electrode current collector; and a first lithium iron phosphate particle layer is disposed on a surface, opposite to the positive electrode current collector, of the second lithium iron phosphate particle layer.

8. The lithium iron phosphate positive electrode plate according to claim 6, wherein:

the first lithium iron phosphate particle layer has a thickness of 65 μm to 250 μm; and the second lithium iron phosphate particle layer has a thickness of 60 μm to 250 μm.

9. The lithium iron phosphate positive electrode plate according to claim 6, wherein a thickness ratio of the first lithium iron phosphate particle layer to the second lithium iron phosphate particle layer is 1:0.1 to 9.

10. The lithium iron phosphate positive electrode plate according to claim 6, wherein:

the first lithium iron phosphate particle layer has a surface density of 0.1 to 0.3 g/1540.25 $mm^2$; and the second lithium iron phosphate particle layer has a surface density of 0.1 g to 0.3 g/1540.25 $mm^2$.

11. A secondary battery, comprising the lithium iron phosphate positive electrode plate according to claim 1.

12. A battery module, comprising the secondary battery according to claim 11.

13. A battery pack, comprising the battery module according to claim 12.

14. An electrical device, comprising the secondary battery according to claim 11.

* * * * *